INVENTOR.
THURE H. WEGENER

Nov. 25, 1969     T. H. WEGENER     3,479,895
WINCH MECHANISM

Filed Dec. 4, 1967     2 Sheets-Sheet 2

INVENTOR.
THURE H. WEGENER
BY Robert A. Green
ATTORNEY 3,479,895
WINCH MECHANISM
Thure H. Wegener, Cranbury-S. River Road,
Cranbury, N.J. 08512
Filed Dec. 4, 1967, Ser. No. 687,554
Int. Cl. F16h 3/10
U.S. Cl. 74—333    8 Claims

ABSTRACT OF THE DISCLOSURE

This application discloses a winch mechanism which includes a worm which drives a worm wheel, to which is attached a cable drum. The worm has its ends provided with lugs which are adapted to be engaged by corresponding lugs on loosely and slidably mounted forward and reverse driving gears. The driving gears are adapted to be driven by an external power source, with which they are always meshed. All shafts in the apparatus are of the simplest form and require no critical machining.

In another form of the disclosure, the worm is keyed to its shaft, as are its forward and reverse driving gears, which, in this case, do not engage the worm. An external input power shaft is provided with forward and reverse power gears which carry lugs adapted to be engaged and driven by a cylinder keyed to the shaft and having lugs at its ends for engaging one or the other of the power gears. Again, driving and driven gears are always meshed, and all shafts are of the simplest form.

BACKGROUND OF THE INVENTION

Up to the present time, reversible winches have included sliding clutches and spline shafts having driving gears on either side and coupled to the shaft through a keyway. This combination is used to transmit power in forward and reverse directions. With this type of arrangement, when the clutch is moved to disengage the gears, the gears and clutch are put under a heavy load due to the torque on the lugs and the sides of the spline shaft, and disengagement is usually difficult and often impossible. In addition, shafts, gears, and clutches of this type are critical in dimension and must be accurately machined. Thus, they represent a considerable expense in a winch mechanism.

SUMMARY OF THE INVENTION

The present invention utilizes a shaft merely to support a combination of forward and reverse driving or driven gears, which are permanently meshed, and a worm or the like. The gears and worm are adapted to be coupled to each other by lugs on the facing surfaces thereof to provide the desired rotation of a worm wheel on a winch drum or the like. Since work is not performed by power transmitted to the shaft, but rather from one gear to another sliding on a shaft, the structure need not be critically machined, and, as a result, it is relatively inexpensive.

DESCRIPTION OF THE PREFERRED EMBODIMENTS

Figure 1:
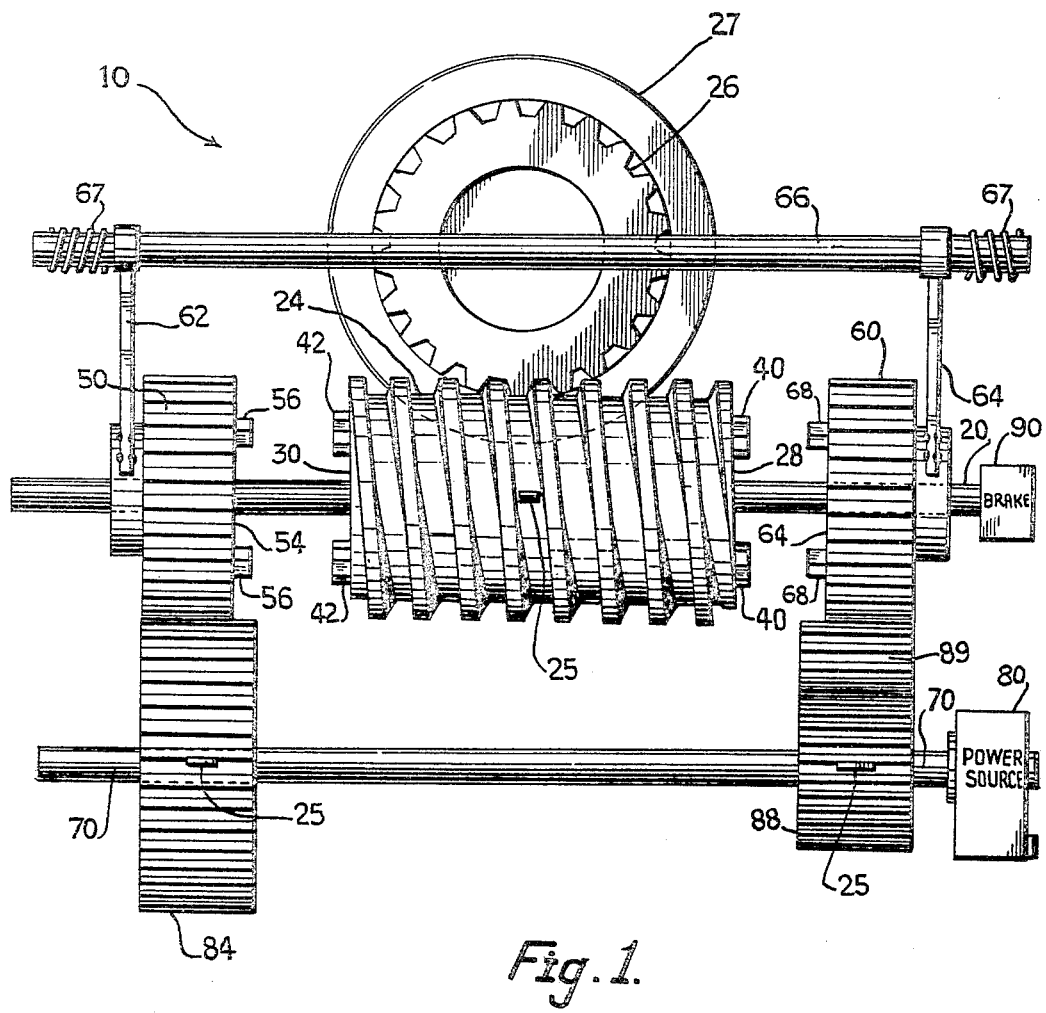
FIG. 1 is a side elevational view of a winch embodying the invention.

A winch 10 embodying the invention includes a driven shaft 20 which carries a worm 24 which is fixed to the shaft by a suitable key arrangement represented at 25. A worm wheel 26 is suitably coupled to the worm 24 and itself is coupled to a drum 27. The worm 24 includes at its ends relatively flat operating faces 28 and 30 on which operating lugs 40 and 42, respectively, are provided. Adjacent to one end or face 30 of the worm 24, a forward drive gear 50 is mounted so that it can rotate and slide freely on shaft 20. Gear 50 includes a surface 54 which faces the end or face 30 of the worm 24 and carries lugs 56 which are adapted to engage the lugs 42 of the worm. A similar reversing drive gear 60 is mounted so that it can rotate and slide freely on the main shaft adjacent to the other end or face 28 of the worm 24 and includes a surface 64 which faces the surface 28 of the worm and includes lugs 68 which are adapted to engage the lugs 40 on the worm.

The driver gears 50 and 60 are secured by shifter arms 62 and 64, respectively, to shifter shaft 66 whereby the gears 50 and 60 are held in the desired spaced relationship to be described further below. This coupling also permits the user to manipulate the shifter shaft to cause either drive gear 50 or 60 to engage worm 24. Both gears 50 and 60 may also be held in neutral position by means of neutralizing springs 67 mounted on the shifter shaft 66.

Mounted adjacent to the main shaft 20 is a second power input or drive shaft 70 which is coupled to a suitable power source represented schematically at 80. Shaft 70 carries a first gear 84 keyed thereto (represented by numeral 25), this first gear being wider than drive gear 50 and wide enough so that, when gear 50 is shifted on shaft 20 to engage or disengage from form 24, it is not disengaged from gear 84. Also mounted on drive shaft 70 is a second gear 88 keyed thereto (represented by numeral 25) which meshes with an idler gear 89 which reverses the rotation of drive gear 60. Similarly, this idler gear 89 is also of sufficient width with respect to drive gear 60 so that, when drive gear 60 is shifted either way, it is not disengaged from idler gear 89.

In operation of winch mechanism 10, power source 80 rotates shaft 70 whereby gears 84 and 88 and gears 56 and 60 are rotated. Gear 56 turns in one direction and gear 60 turns in the opposite direction. Assuming that it is desired to drive the worm 24 in the forward direction and thus wind a cable on drum 27, then the shifter shaft 66 is moved to the right as seen in FIG. 1. Gear 54 is thus brought into operative relation with worm 24, and the lugs 56 on gear 54 engage lugs 42 on worm 24 and cause the worm to rotate. If it is desired to drive the worm 24 in the reverse direction and remove the cable from the drum 27, then the shifter shaft 66 is moved to the left, and lugs 68 on gear 60 engage lugs 40 on the worm and rotate the worm in the opposite direction.

With the arrangement described above, the worm 24 is keyed to the shaft 20 for only two purposes, (1) to turn the worm 24 on bearings, not shown, for reduced friction, and to allow a brake 90 to be attached to one end of the shaft 20, for the purpose of stopping the worm when lowering a load.

It is to be noted that keyway 25 or worm 24 is not used to transmit power, and there is thus no danger of breaking the keyway under very heavy load conditions or sudden shock loads.

Figure 2:
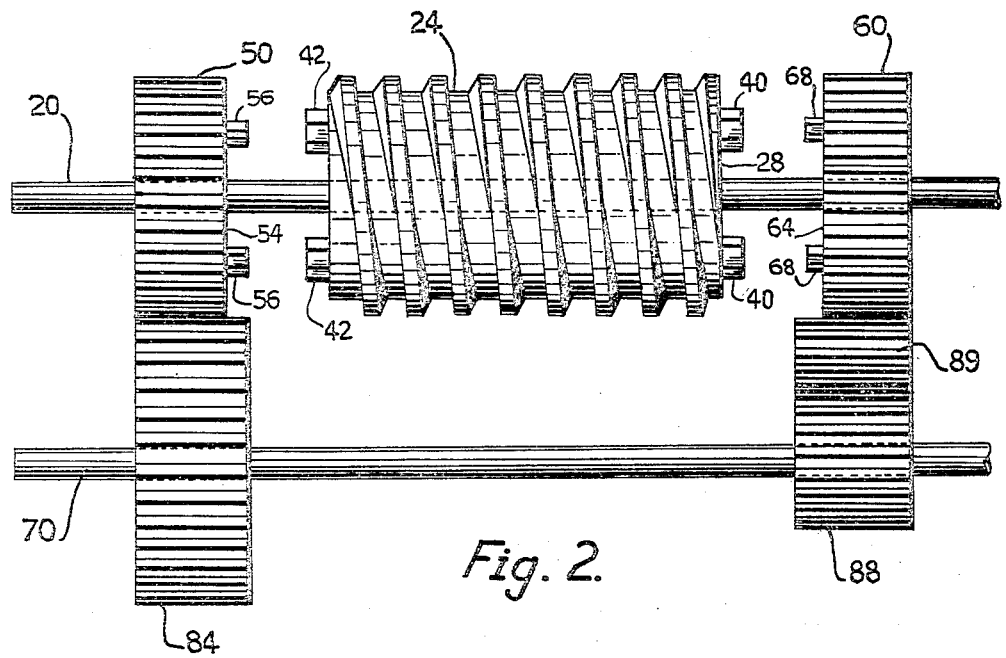
FIG. 2 is a side elevational view of a modification of a portion of the apparatus of FIG. 1.

Referring to FIG. 2, if an internal brake is provided directly on the worm 24, or the worm is of the self-locking type and no other brake is required, the worm 24 may be loosely mounted on the shaft in suitable bearings, and shaft 20 may then be stationary.

Figure 3:
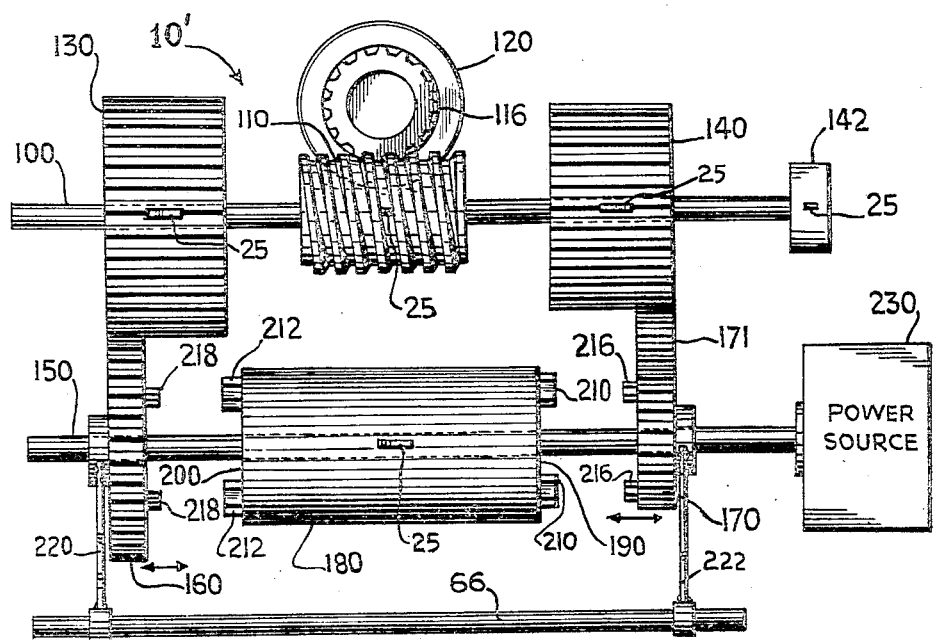
FIG. 3 is a side elevational view of a modification of the invention.

In a modification of the invention shown in FIG. 3, a winch 10' includes a first driven shaft 100 which carries a worm 110 keyed thereto as at 25 and coupled to a worm wheel 116 on a cable drum 120 as above. Forward and reverse gears 130 and 140, respectively, are also keyed (as at 25) to the shaft 100 as is a brake 142. The winch 10′ also includes an input power drive shaft 150 which carries a forward drive gear 160 loosely mounted thereon and a reverse drive gear 170 and idler 171 also loosely mounted thereon. Gear 160 is mounted in engagement with gear 130, and gear 170 and its idler 171 are mounted in engagement with gear 140 on shaft 100. A clutch 180 is keyed to shaft 150. The clutch 180 is cylindrical and does not require threads or teeth on its surface, but its end faces 190 and 200 are provided with lugs 210 and 212. The lugs are adapted to engage corresponding lugs 216 and 218, respectively, on the facing surfaces of the reverse and forward gear arrangements 170 and 160, respectively. A shifter mechanism 66 or the like is coupled to gears 160 and 170 by means of arms 220 and 222 to shift them as required to engage clutch 180 and thereby to cause driving power to be transmitted to shaft 100 and worm 110.

In operation of this modification of the invention, the drive shaft 150 is coupled to a power source 230, and shifter 66 is adapted to cause the cylindrical clutch 180 to engage either the forward or reverse gear driving arrangements 160 or 170, and this causes one of the gears 130 or 140 on the driven shaft 100 to be rotated. Since gears 130 and 140 are keyed to shaft 100, when one of them rotates, the shaft 100 rotates, turns worm 110, and this turns the cable drum 120.

It is to be noted that the drawings illustrate the invention schematically in part and that necessary support members, bearings, and other components normally provided are not shown. For example, the shafts to support idler gears 89 and 171 are not shown, but it is well known that such shafts would ordinarily be provided. In addition, the relative orientation of the parts may be varied within the scope of the invention. Also, dimensions in the drawings may not always appear to support the description in the specification although those skilled in the art will understand and provide the dimensions required to practice the invention. For example, although the gears in FIG. 3 may not appear to be dimensioned to do so, it is clear that the gear widths should be such that gear 170 is always in contact with idler 171, idler 171 is always in contact with gear 140, and gear 160 is always in contact with gear 130 as shifter 66 is operated in either direction.

The winch mechanism of the invention has many advantages, the most important of which is that it is simple in construction and operation, and, as a result, it is relatively inexpensive to manufacture. The apparatus of the invention has no critically machined spline shafts and requires no conventional clutch for its operation. Since driving and driven gears are always engaged and power is transmitted through lugs as described, large damaging torques are avoided.

What is claimed is:
1. Power transmission apparatus comprising:
   a main drive shaft coupled to a power source for rotating said shaft,
   a drive gear fixed to said drive shaft,
   a second shaft for supporting other working components positioned adjacent to said main shaft,
   a second gear slidably and freely supported on said second shaft and adapted to slide along a path while remaining in constant engagement with said drive gear,
   a third gear supported on said second shaft and permissibly loosely mounted thereon, said third gear being the output member of said transmission and coupled to a utilization device which is operated thereby,
   said second gear and said third gear having complementary locking means which engage when said second gear is moved over said path toward said third gear, whereby power is transmitted independently of said second shaft from said power source to said drive gear, to said second gear and from said second gear directly to said third gear and to said utilization device.

2. The apparatus defined in claim 1 wherein said locking means comprises a first set of lugs carried on an end face of said third gear and a first set of complementary lugs carried on said second gear, said lugs easily engaging and disengaging each other as said second gear moves toward and away from said third gear.

3. The apparatus defined in claim 1 wherein said third gear is a worm gear having an end face facing said second gear, and said locking means comprises a first set of lugs carried on said end face of said third gear and a first set of complementary lugs carried on said second gear, said lugs easily engaging and disengaging each other as said second gear moves toward and away from said third gear.

4. The apparatus defined in claim 1 and including shift means in operative relation with said second and third gears for moving them into and out of engagement with each other.

5. The apparatus defined in claim 4 wherein said shift means is secured to said second gear.

6. The apparatus defined in claim 4 and including a fourth gear slidably and freely supported on said second shaft and adapted to move into and out of engagement with said third gear, said shift means being coupled to said fourth gear.

7. Power transmission apparatus comprising:
   a main drive shaft coupled to a power source for rotating said shaft,
   first and second spaced-apart drive gears fixed to said shaft,
   a second shaft adjacent to said main shaft for supporting other working components,
   a first free-floating driven gear slidably mounted on said second shaft and permanently engaging said first gear,
   a second free-floating driven gear slidably mounted on said second shaft and permanently engaging said second gear through an idler gear,
   a shifter secured to said first and second free-floating gears for sliding them on said shaft, said first and second free-floating gears being always in engagement with said first and second gears as they are moved on said shaft by said shifter, and
   a worm gear on said shaft and permissibly loosely mounted thereon and comprising the output member of said transmission, said worm gear thush being coupled to a utilization device,
   said worm gear having a first end face facing said first driven gear and a second end face facing said second driven gear,
   said first end face of said worm gear having first lugs and said first driven gear having first complementary lugs which are adapted to lock together when said shifter moves said first driven gear to said worm gear to rotate said worm gear in one direction,
   said second end face of said worm gear having second lugs and said second driven gear having second complementary lugs which engage each other when said shifter moves said second driven gear to said worm gear to rotate said worm gear in the opposite direction,
   the coupling of said first driven gear and said second driven gear to said worm and the transmission of power thereto being independent of said second shaft and being by a direct connection therebetween.

8. The apparatus defined in claim 4 and including a fourth gear slidably and freely supported on said second shaft and adapted to move into and out of engagement with said third gear, said shift means being coupled to said fourth gear, said fourth gear also carrying a set of lugs for engaging a corresponding set of lugs on another end face of said third gear.

References Cited

UNITED STATES PATENTS

| 780,733 | 1/1905 | Smith | 192—4 |
| 843,154 | 2/1907 | Lambert | 74—355 |
| 1,475,350 | 11/1923 | Marvin | 74—333 |
| 1,699,715 | 1/1929 | Rey | 74—333 |
| 1,912,112 | 5/1933 | Wunsch | 192—4 |
| 2,125,195 | 7/1938 | Palen | 74—333 X |

DONLEY J. STOCKING, Primary Examiner

THOMAS C. PERRY, Assistant Examiner

U.S. Cl. X.R.

74—355; 254—187